(12) United States Patent
Melester et al.

(10) Patent No.: US 10,142,036 B2
(45) Date of Patent: Nov. 27, 2018

(54) CONFIGURATION SUB-SYSTEM FOR TELECOMMUNICATION SYSTEMS

(71) Applicant: ANDREW WIRELESS SYSTEMS GMBH, Buchdorf (DE)

(72) Inventors: Matthew Thomas Melester, McKinney, TX (US); Stefan Eisenwinter, Buchdorf (DE); Ahmed H. Hmimy, Richardson, TX (US); Massimiliano Mini, Forli (IT); Joerg Stefanik, Donauwoerth (DE); Alfons Dussmann, Gansheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 55 days.

(21) Appl. No.: 14/448,080

(22) Filed: Jul. 31, 2014

(65) Prior Publication Data

US 2014/0342674 A1    Nov. 20, 2014

Related U.S. Application Data

(63) Continuation of application No. 13/621,504, filed on Sep. 17, 2012, now Pat. No. 8,831,593.

(Continued)

(51) Int. Cl.
*H04W 52/00* (2009.01)
*H04B 17/00* (2015.01)
(Continued)

(52) U.S. Cl.
CPC ......... *H04B 17/0085* (2013.01); *H04B 1/006* (2013.01); *H04B 17/12* (2015.01);
(Continued)

(58) Field of Classification Search
CPC ........ H04B 17/11; H04B 17/12; H04B 17/13; H04B 17/14
(Continued)

(56) References Cited

U.S. PATENT DOCUMENTS 4,918,684 A   4/1990 Boschet et al.
5,353,332 A   10/1994 Raith et al.
(Continued)

FOREIGN PATENT DOCUMENTS

CN   101572903   11/2009
CN   101610135   12/2009
(Continued)

OTHER PUBLICATIONS

European Patent Application No. EP12826731.7, Extended European Search Report, dated Mar. 12, 2015, 10 pages.

(Continued)

*Primary Examiner* — Wen W Huang
(74) *Attorney, Agent, or Firm* — Fogg & Powers LLC

(57) ABSTRACT

Certain aspects are directed to a configuration sub-system for telecommunication systems. The configuration sub-system can include a test signal generator, a power measurement device, at least one additional power measurement device, and a controller. The test signal generator can be integrated into components of a telecommunication system. The test signal generator can provide a test signal to a signal path of the telecommunication system. The power measurement device and the additional power measurement device can respectively be integrated into different components of the telecommunication system. The power measurement device and the additional power measurement device can respectively measure the power of the test signal at different measurement points in the signal path. The controller can normalize signals transmitted via the telecommunication (Continued)

system by adjusting a path gain for the signal path based on measurements from the power measurement device and the additional power measurement device.

23 Claims, 8 Drawing Sheets

Related U.S. Application Data

(60) Provisional application No. 61/535,060, filed on Sep. 15, 2011.

(51) Int. Cl.
```
H04B 17/12      (2015.01)
H04W 24/10      (2009.01)
H04W 88/08      (2009.01)
H04B 1/00       (2006.01)
H04W 52/24      (2009.01)
H04B 1/40       (2015.01)
H04W 52/14      (2009.01)
```

(52) U.S. Cl.
CPC ......... *H04W 24/10* (2013.01); *H04W 88/085* (2013.01); *H04B 1/40* (2013.01); *H04W 52/143* (2013.01); *H04W 52/24* (2013.01); *H04W 52/245* (2013.01)

(58) Field of Classification Search
USPC ..................................................... 455/67.11
See application file for complete search history.

(56) References Cited

U.S. PATENT DOCUMENTS

| | | |
|---|---|---|
| 5,507,007 A | 4/1996 | Gunmar et al. |
| 5,548,820 A | 8/1996 | Victorin |
| 5,574,466 A | 11/1996 | Reed et al. |
| 5,594,350 A | 1/1997 | Koizumi et al. |
| 5,682,256 A | 10/1997 | Motley et al. |
| 5,691,729 A | 11/1997 | Gutman et al. |
| 5,694,082 A | 12/1997 | Schmidt |
| 5,748,001 A | 5/1998 | Cabot |
| 5,909,642 A | 6/1999 | Suzuki |
| 6,009,129 A | 12/1999 | Kenney et al. |
| 6,047,199 A | 4/2000 | Demarco |
| 6,128,470 A | 10/2000 | Naidu |
| 6,128,500 A | 10/2000 | Raghavan et al. |
| 6,144,692 A | 11/2000 | Beck |
| 6,366,776 B1 | 4/2002 | Wright et al. |
| 6,418,327 B1 | 7/2002 | Carey et al. |
| 6,646,449 B2 | 11/2003 | Seppinen et al. |
| 6,708,036 B2 | 3/2004 | Proctor et al. |
| 6,731,237 B2 | 5/2004 | Gustafson et al. |
| 6,801,767 B1 | 10/2004 | Schwartz et al. |
| 6,826,164 B2 | 11/2004 | Mani et al. |
| 6,842,431 B2 | 1/2005 | Clarkson et al. |
| 6,873,827 B1 | 3/2005 | Wright |
| 6,895,247 B2 | 5/2005 | Mostafa |
| 6,937,863 B1 | 8/2005 | Gordon et al. |
| 6,947,472 B2 | 9/2005 | Blessent |
| 6,996,374 B1 | 2/2006 | Bao et al. |
| 7,013,136 B2 | 3/2006 | Frangione et al. |
| 7,025,262 B2 | 4/2006 | Byskov et al. |
| 7,082,320 B2 | 7/2006 | Kattukaran et al. |
| 7,103,377 B2 | 9/2006 | Bauman et al. |
| 7,120,546 B2 | 10/2006 | Zyss et al. |
| 7,123,023 B2 | 10/2006 | Minihold et al. |
| 7,127,175 B2 | 10/2006 | Mani et al. |
| 7,127,211 B2 | 10/2006 | Hildebrand et al. |
| 7,167,507 B2 | 1/2007 | Mailaender et al. |
| 7,200,391 B2 | 4/2007 | Chung et al. |
| 7,205,864 B2 | 4/2007 | Schultz, Jr. et al. |
| 7,224,170 B2 | 5/2007 | Graham et al. |
| 7,272,408 B2 | 9/2007 | Dalal et al. |
| 7,286,507 B1 | 10/2007 | Oh et al. |
| 7,313,415 B2 | 12/2007 | Wake et al. |
| 7,394,826 B2 | 7/2008 | Cain et al. |
| 7,403,503 B2 | 7/2008 | Cuffaro et al. |
| 7,447,490 B2 | 11/2008 | Kuo et al. |
| 7,466,750 B2 | 12/2008 | Kim et al. |
| 7,469,105 B2 | 12/2008 | Wake et al. |
| 7,474,635 B2 | 1/2009 | Linsky et al. |
| 7,603,093 B2 | 10/2009 | Kremer et al. |
| 7,792,226 B2 | 9/2010 | Yu et al. |
| 7,831,257 B2 | 11/2010 | Pollman et al. |
| 7,852,951 B2 | 12/2010 | Kalluri et al. |
| 7,876,867 B2 | 1/2011 | Filipovic et al. |
| 7,974,244 B2 | 7/2011 | Hermel |
| 7,983,645 B2 | 7/2011 | Broyde et al. |
| 8,175,540 B2 | 5/2012 | Jones |
| 8,515,339 B2 | 8/2013 | Yona et al. |
| 8,831,593 B2 | 9/2014 | Melester et al. |
| 9,036,486 B2 | 5/2015 | Maca et al. |
| 9,312,895 B1 | 4/2016 | Gupta et al. |
| 2002/0094785 A1 | 7/2002 | Deats |
| 2003/0039319 A1 | 2/2003 | Engelse et al. |
| 2003/0040329 A1 | 2/2003 | Yona et al. |
| 2003/0073463 A1 | 4/2003 | Shapira |
| 2003/0153273 A1 | 8/2003 | Ebert et al. |
| 2003/0157967 A1 | 8/2003 | Saunders et al. |
| 2004/0233900 A1 | 11/2004 | Andersen et al. |
| 2005/0102449 A1 | 5/2005 | Durston |
| 2005/0185593 A1 | 8/2005 | Yen et al. |
| 2005/0259684 A1 | 11/2005 | Csapo |
| 2005/0282506 A1* | 12/2005 | Azuma ................ H04B 7/0615 455/115.1 |
| 2006/0002326 A1 | 1/2006 | Vesuna |
| 2006/0019679 A1 | 1/2006 | Rappaport et al. |
| 2006/0094470 A1 | 5/2006 | Wake et al. |
| 2007/0010224 A1 | 1/2007 | Shi |
| 2007/0135056 A1 | 6/2007 | Kremer et al. |
| 2007/0213006 A1 | 9/2007 | Wong et al. |
| 2007/0259625 A1 | 11/2007 | Tolaio et al. |
| 2008/0039089 A1 | 2/2008 | Berkman et al. |
| 2008/0198955 A1 | 8/2008 | Oren et al. |
| 2008/0200117 A1 | 8/2008 | Oren et al. |
| 2008/0287083 A1 | 11/2008 | Payne, IV |
| 2008/0298445 A1 | 12/2008 | Richardson et al. |
| 2009/0017835 A1 | 1/2009 | Song et al. |
| 2009/0023403 A1 | 1/2009 | LaBerge |
| 2009/0027282 A1* | 1/2009 | Finn .................. H04B 1/18 343/703 |
| 2009/0086028 A1 | 4/2009 | Miller et al. |
| 2009/0086864 A1 | 4/2009 | Komninakis et al. |
| 2009/0239475 A1 | 9/2009 | Lehman |
| 2009/0298422 A1 | 12/2009 | Conroy et al. |
| 2010/0029237 A1 | 2/2010 | Yamamoto et al. |
| 2010/0085061 A1 | 4/2010 | Bradley et al. |
| 2010/0113006 A1 | 5/2010 | Pajjuri et al. |
| 2010/0128676 A1 | 5/2010 | Wu et al. |
| 2010/0135437 A1 | 6/2010 | Lee et al. |
| 2010/0142390 A1 | 6/2010 | Sun et al. |
| 2010/0142663 A1 | 6/2010 | Yoon et al. |
| 2010/0164504 A1 | 7/2010 | Bradley |
| 2010/0178936 A1 | 7/2010 | Wala et al. |
| 2010/0197238 A1 | 8/2010 | Pathuri et al. |
| 2010/0202356 A1 | 8/2010 | Fischer et al. |
| 2010/0248616 A1* | 9/2010 | Karl Frederick .. H04B 17/0085 455/9 |
| 2010/0260103 A1 | 10/2010 | Guey et al. |
| 2010/0278530 A1 | 11/2010 | Kummetz et al. |
| 2010/0295533 A1 | 11/2010 | Kuga et al. |
| 2011/0059709 A1 | 3/2011 | Collins, III |
| 2011/0080847 A1* | 4/2011 | Kenkel ................ H04B 1/205 370/254 |
| 2011/0085490 A1* | 4/2011 | Schlee ................ H04B 17/102 370/315 |
| 2011/0105184 A1 | 5/2011 | Piirainen et al. |
| 2011/0135308 A1 | 6/2011 | Tarlazzi |
| 2011/0151839 A1 | 6/2011 | Bolon et al. |
| 2011/0158211 A1 | 6/2011 | Gaal et al. |
| 2011/0164878 A1 | 7/2011 | Ma et al. |

(56) References Cited

U.S. PATENT DOCUMENTS

| | | | |
|---|---|---|---|
| 2011/0201269 A1 | 8/2011 | Hobbs et al. | |
| 2011/0237182 A1* | 9/2011 | Stratford | H04W 52/52 455/7 |
| 2012/0093269 A1 | 4/2012 | Yu et al. | |
| 2012/0134666 A1* | 5/2012 | Casterline | H04B 10/25754 398/22 |
| 2012/0140685 A1 | 6/2012 | Lederer et al. | |
| 2012/0282889 A1 | 11/2012 | Tanaka et al. | |
| 2012/0309328 A1 | 12/2012 | Morrison et al. | |
| 2013/0017863 A1 | 1/2013 | Kummetz et al. | |
| 2013/0071112 A1 | 3/2013 | Melester et al. | |
| 2013/0095870 A1 | 4/2013 | Phillips et al. | |
| 2013/0182753 A1 | 7/2013 | Delforce et al. | |
| 2013/0260705 A1 | 10/2013 | Stratford | |
| 2014/0024402 A1 | 1/2014 | Singh | |
| 2014/0119197 A1 | 5/2014 | Maca et al. | |
| 2015/0078191 A1 | 3/2015 | Jongren et al. | |
| 2016/0337050 A1 | 11/2016 | Melester et al. | |
| 2016/0352612 A1* | 12/2016 | Daniel | H04L 5/14 |

FOREIGN PATENT DOCUMENTS

| | | |
|---|---|---|
| CN | 101635590 | 3/2010 |
| CN | 103733664 | 4/2014 |
| CN | 103875270 | 6/2014 |
| CN | 103891179 | 6/2014 |
| EP | 1081883 | 3/2001 |
| EP | 2661828 | 11/2013 |
| EP | 2732653 | 5/2014 |
| EP | 2756619 | 7/2014 |
| HK | 1198078 | 3/2015 |
| JP | 2002190780 | 7/2002 |
| JP | 2005151189 | 6/2005 |
| KR | 19980067669 | 10/1998 |
| KR | 20020041516 | 6/2002 |
| KR | 2005049070 | 5/2005 |
| KR | 2006120361 | 11/2006 |
| KR | 2007118460 | 12/2007 |
| KR | 20070117791 | 12/2007 |
| KR | 2008086604 | 9/2008 |
| KR | 20090010523 | 1/2009 |
| KR | 2009080762 | 7/2009 |
| WO | 9739597 | 10/1997 |
| WO | 2005109700 | 11/2005 |
| WO | 2007044653 | 4/2007 |
| WO | 2008027213 | 3/2008 |
| WO | 2008088862 | 7/2008 |
| WO | 2009039396 | 3/2009 |
| WO | 2009082084 | 7/2009 |
| WO | 2011156465 | 12/2011 |
| WO | 2013009835 | 1/2013 |
| WO | 2013033199 | 3/2013 |
| WO | 2013040579 | 3/2013 |
| WO | 2013040589 | 3/2013 |
| WO | 2014040608 | 3/2014 |

OTHER PUBLICATIONS

U.S. Appl. No. 13/546,425 , Final Office Action, dated Feb. 24, 2015, 20 pages.
European Patent Application No. EP12832171.8 , Office Action, dated Feb. 13, 2015, 6 pages.
U.S. Appl. No. 13/978,966 , Notice of Allowance, dated Jan. 21, 2015, 11 pages.
Office Action dated Dec. 3, 2014 issued on related Chinese Patent Application No. CN201280050939.8 , 11pages.
European Patent Office, "Office Action for EP Application No. 12832025.6", "from Foreign Counterpart to U.S. Appl. No. 13/621,504", May 10, 2016, pp. 1-4, Published in: EP.
Australian Patent Office, "Office Action for AU 2012308170", "from Foreign Counterpart to U.S. Appl. No. 13/621,504", Feb. 11, 2016, pp. 1-4, Published in: AU.
European Patent Application No. EP12832025.6 , Extended European Search Report, dated Jul. 2, 2015, 12 pages.
Tolstrup , "Noise", Indoor Radio Planning, Jul. 14, 2011, pp. 295-328.
"An Introduction to Neutral Host Distributed Antenna Systems," Infinity Networks, Published at least by Nov. 7, 2004, 14 pages.
"Distributed Antenna Systems and MIMO Technology," TE Connectivity Wireless and Services, Apr. 2011, 8 pages.
Bell et al., "Range to Fault Technology," Retrieved from the Internet: http://www.livingston.co.uk/files/bestanden/rtfwhitepaper.pdf. Jan. 1, 2011, Kaelus Inc., 10 pages.
Brahmanapally et al., "Analysis and determination of intermodulation hits in mobile communication," *Proceedings of the 8th WSEAS International Conference on Data Networks, Communications, Computers, DNCOCO '09*, Nov. 7-9, 2009, pp. 130-137 (Provided One Page Abstract Only).
Chalmers, "Detecting and correcting intermodulation," *Global Communications*, 1985, vol. 7, Issue 1, pp. 22-25 (Provided One Page Abstract Only).
European Patent Application No. EP12832171.8, Extended European Search Report, dated Apr. 24, 2014, 9 pages.
Feng et al., "Downlink Capacity of Distributed Antenna Systems in a Multi-Cell Environment," Communications and Networking, Sep. 2010, 14 pages.
Heath, Jr. et al., "Multiuser MIMO in Distributed Antenna Systems," Signals, Systems and Computers (ASILOMAR), 2010 Conference Record of the Forty Fourth Asilomar Conference, Nov. 2010, 5 pages.
International Patent Application No. PCT/US2012/046207, International Search Report and Written Opinion, dated Nov. 15, 2012, 11 pages.
International Patent Application No. PCT/US2012/046207, International Preliminary Report on Patentability, dated Jan. 23, 2014, 8 pages.
International Patent Application No. PCT/US2012/052845, International Search Report and Written Opinion, dated Jan. 30, 2013, 8 pages.
International Patent Application No. PCT/US2012/055793, International Search Report and Written Opinion, dated Dec. 28, 2012, 9 pages.
International Patent Application No. PCT/US2012/055793, International Preliminary Report on Patentability, dated Mar. 27, 2014, 6 pages.
International Patent Application No. PCT/US2012/055807, International Search Report and Written Opinion, dated Dec. 26, 2012, 9 pages.
International Patent Application No. PCT/US2012/055807, International Preliminary Report on Patentability, dated Mar. 27, 2014, 6 pages.
Nash, "Intermodulation Distortion Problems at UMTS Cell Sites," Aeroflex Wireless Test Solutions, Burnham, UK (http://www.aeroflex.com/ats/products/prodfiles/articles/8814/Intermod.pdf), Published at least by Jan. 3, 2010, pp. 1-10.
Qiang et al., "Study on Computer-Based Integrated Passive Inter-Modulation Measurement System," *Chinese Journal of Scientific Instrument*, Jul. 2009, pp. 1540-1545.
Singh et al., "Systems Methodology for PIM Mitigation of Communications Satellites," 4th International Workshop on Multipactor, Corona and Passive Intermodulation in Space RF Hardware, Sep. 8-11, 2003, 9 pages.
U.S. Appl. No. 13/546,425, Non-Final Office Action, dated Jul. 31, 2014, 16 pages.
U.S. Appl. No. 13/621,504, Non-Final Office Action, dated Feb. 13, 2014, 28 pages.
U.S. Appl. No. 13/621,504, Notice of Allowance, dated Jun. 18, 2014, 7 pages.
U.S. Appl. No. 13/978,966, Non-Final Office Action, dated Apr. 15, 2014, 34 pages.
U.S. Appl. No. 13/978,966, Non-Final Office Action dated Sep. 5, 2014, 32 pages.
United States Patent and Trademark Office, "Office Action", "from U.S. Appl. No. 13/546,425", dated Jul. 31, 2014, pp. 1-16, Published in: US.

(56) References Cited

OTHER PUBLICATIONS

European Patent Office, "Extended European Search Report for EP Application No. 16150415.4", "from Foreign Counterpart to U.S. Appl. No. 13/978,966", dated Apr. 15, 2016, pp. 1-10, Published in: EP.

European Patent Office, "Communication under Rule 71(3) for EP Application No. 12832171.8", "from Foreign counterpart to U.S. Appl. No. 13/978,966", dated Sep. 25, 2015, pp. 1-108, Published in: EP.

European Patent Office, "Communication under Rule 71(3) EPC for EP Application No. 16150415.4", "from Foreign Counterpart to U.S. Appl. No. 13/978,966", dated Apr. 4, 2017, pp. 158, Published in: EP.

United States Patent and Trademark Office, "Office Action", "from U.S. Appl. No. 14/676,275", dated Feb. 23, 2017, pp. 1-27, Published in: US.

United States Patent and Trademark Office, "Notice of Allowance", "from U.S. Appl. No. 14/428,254", dated Mar. 2, 2017, pp. 1-7, Published in: US.

United States Patent and Trademark Office, "Office Action", "from U.S. Appl. No. 14/428,254", dated Oct. 6, 2016, pp. 1-21, Published in: US.

International Searching Authority, "International Search Report and Written Opinion for PCT Application No. PCT/EP2012/003849", "from Foreign Counterpart to U.S. Appl. No. 14/428,254", dated May 24, 2013, pp. 1-10, Published in: WO.

Australian Patent Office, "Notice of Acceptance for AU Application No. 2012308170", "from Foreign counterpart to U.S. Appl. No. 13/621,504", dated Feb. 14, 2017, pp. 1-3, Published in: AU.

China Patent Office, "Notice of Allowance for CN Application No. 201280050939.8", "from Foreign Counterpart to U.S Appl. No. 13/621,504", dated Jun. 19, 2015, pp. 1-3, Published in: CN.

European Patent Office, "Partial European Search Report for EP Application No. 12832025.6", "from Foreign counterpart to U.S. Appl. No. 13/621,504", dated Mar. 12, 2015, pp. 1-7, Published in: EP.

European Patent Office, "Communication under Rule 71(3) for EP Application No. 12832025.6", "from Foreign counterpart to U.S. Appl. No. 13/621,504", dated Oct. 6, 2016, pp. 1-46, Published in: EP.

Avitec, Rolling Out One Seamless 3G Network, retrieved from the Internet at http://www.intercomms.net/FEB04/content/avitec.php, at least as early as Aug. 24, 2011, 4 pages.

Avitec, "Rolling out one seamless 3G network-no longer a challenge", "http://www.intercomms.net/FEB04/content/avitec.php", pp. 1-4, captured by Internet Archive on May 2, 2004, retrieved from the Internet at https://web.archive.org/web/20040502041952/http://www.intercomms.net:80/FEB04/content/avitec.php on Jun. 1, 2017.

European Patent Office, "Partial European Search Report for EP Application No. 17159052.4", "from Foreign counterpart to U.S. Appl. No. 14/448,080", dated Mar. 27, 2017, pp. 1-9, Published in: EP.

European Patent Office, "Extended European Search Report for EP Application No. 17159062.3", "from Foreign Counterpart to U.S. Appl. No. 15/220,147", dated Mar. 28, 2017, pp. 1-12, Published in: EP.

U.S. Patent and Trademark Office, "Final Office Action from U.S. Appl. No. 14/676,275", "from U.S. Appl. No. 14/676,275", dated Sep. 13, 2017, pp. 1-44, Published in: US.

United States Patent and Trademark Office, "Notice of Allowance", "From U.S. Appl. No. 14/428,254", dated Jun. 26, 2017, pp. 1-27, Published in: US.

European Patent Office, "Extended European Search Report from EP Application No. 17159052.4 dated Jul. 3, 2017", "from Foreign Counterpart of U.S. Appl. No. 13/448,080", dated Jul. 3, 2017, pp. 1-15, Published in: EP.

United States Patent and Trademark Office, "Office Action", "From U.S. Appl. No. 15/220,147", dated Jul. 6, 2017, pp. 1-51, Published in: US.

United States Patent and Trademark Office, "Notice of Allowance", "From U.S. Appl. No. 14/428,254", dated Oct. 2, 2017, pp. 1-9, Published in: US.

U.S. Patent and Trademark Office, "Advisory Action", "U.S. Appl. No. 14/676,275", dated Dec. 15, 2017, pp. 1-9.

United States Patent and Trademark Office, "Office Action for U.S. Appl. No. 14/676,275", dated Apr. 10, 2018, pp. 1-34, Published in: US.

European Patent Office, "Office Action for EP Application No. 17159052.4", "Foreign Counterpart to U.S. Appl. No. 13/621,504", dated Mar. 12, 2018, pp. 1-7, Published in: EP.

European Patent Office, "Office Action for EP Application No. 17159062.3", "Foreign Counterpart to U.S. Appl. No. 13/621,504", dated Mar. 12, 2018, pp. 1-7, Published in: EP.

U.S. Patent and Trademark Office, "Office Action for U.S. Appl. No. 15/220,147", dated Apr. 2, 2018, pp. 1-31, Published in: US.

United States Patent and Trademark Office, "Notice of Allowance from U.S. Appl. No. 15/877,305 dated Sep. 4, 2018," pp. 1-9, Published in US.

* cited by examiner

CONFIGURATION SUB-SYSTEM FOR TELECOMMUNICATION SYSTEMS

CROSS-REFERENCE TO RELATED APPLICATIONS

This is a continuation of U.S. patent application Ser. No. 13/621,504 filed Sep. 17, 2012 and titled "Configuration Sub-System for Distributed Antenna Systems," which claims priority to U.S. Provisional Application Ser. No. 61/535,060 filed Sep. 15, 2011 and titled "Configuration Sub-System for Distributed Antenna Systems," the contents of both of which are hereby incorporated by reference.

TECHNICAL FIELD

The present invention relates generally to telecommunications and more particularly (although not necessarily exclusively) to a configuration sub-system for a distributed antenna system or other telecommunication system.

BACKGROUND

A telecommunication system, such as a distributed antenna system ("DAS") servicing one or more coverage areas, can involve different frequency bands and technologies being used by multiple operators to provide telecommunications service. These factors can increase the complexity of commissioning, analyzing, and automating the operation of a DAS or other telecommunication system. Commissioning a DAS or other telecommunication system can include installing, configuring, and calibrating the components of the DAS or other telecommunication system. Analyzing a DAS or other telecommunication system can include identifying sources of interference with signals communicated via the DAS or other telecommunication system. A non-limiting example of such interference can include passive intermodulation ("PIM") products. Automating the operation of a DAS or other telecommunication system can include automatically normalizing power levels for signals communicated via the DAS or other telecommunication system such that signals are radiated in coverage areas or provided to base stations at specified power levels.

Current solutions for analyzing, and automating the operation of a DAS or other telecommunication system can involve greater expenditures of time and resources, as well as increased likelihood of error. For example, commissioning a DAS can involve manually measuring the power of a signal at various points along the network and making manual adjustments to normalize, relative to one another, the losses between the same signals going to the same remote antenna unit.

Systems and methods that can reduce the complexity of commissioning, analyzing, and automating the operation of a DAS or other telecommunication system are therefore desirable.

SUMMARY

In one aspect, a configuration sub-system is provided. The configuration sub-system can include a test signal generator, a power measurement device, at least one additional power measurement device, and a controller. The test signal generator can be integrated into one or more components of a telecommunication system. The test signal generator can provide a test signal to a signal path of the telecommunication system. The power measurement device can be integrated into a component of the telecommunication system. The power measurement device can measure the power of the test signal (or any other service signal) at a measurement point in the signal path traversed by the test signal. The additional power measurement device can be integrated into an additional component of the telecommunication system. The additional power measurement device can measure the power of the test signal (or any other service signal) at an additional measurement point in the signal path traversed by the test signal (or any other service signal). The controller can normalize signals transmitted via the telecommunication system by adjusting a path gain for the signal path based on measurements from the power measurement device and the additional power measurement device.

In another aspect, a method is provided. The method involves a configuration sub-system providing a test signal to a signal path in a telecommunication system. The method also involves the configuration sub-system receiving a power measurement for the test signal (or any other service signal) at two or more measurement points in the signal path. The method also involves the configuration sub-system normalizing signals transmitted via the telecommunication system by adjusting a path gain for the signal path based on power measurements at the two or more measurement points.

In another aspect, a distributed antenna system is provided. The distributed antenna system can include a test signal generator disposed in a base station router and a controller disposed in the base station router. The test signal generator can provide a respective test signal to each of multiple signal paths of the distributed antenna system. Each of the signal paths can include a power measurement device integrated into a unit of the respective signal path and at least one additional power measurement device integrated into at least one additional component of the respective signal path. The power measurement device can measure the power of the test signal (or any other service signal) at a measurement point in the respective signal path traversed by the test signal. The additional power measurement device can measure the power of the test signal (or any other service signal) at an additional measurement point in the respective signal path traversed by the test signal. The controller can normalize signals transmitted via the distributed antenna system by adjusting a path gain for each signal path based on power measurements from the power measurement device and the additional power measurement device.

In another aspect, a configuration sub-system is provided. The configuration sub-system includes a test signal generator, an identification signal module, and a controller. The test signal generator is integrated into one or more components of a telecommunication system. The test signal generator is configured to provide a test signal to a signal path of the telecommunication system. The identification signal module is configured to provide an identification signal with the test signal. The identification signal identifies a device from which the identification signal originated. The controller is configured to receive a report from each component in the signal path indicating receipt of the identification signal. The controller is also configured to identify each component of the signal path reporting receipt of the identification signal.

DETAILED DESCRIPTION

Figure 1:
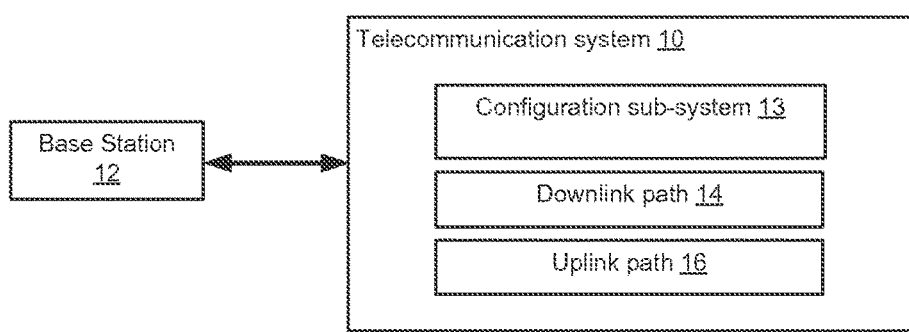
FIG. 1 is a block diagram of a base station coupled to a telecommunication system that has a configuration sub-system according to one aspect.

Certain aspects and examples are directed to a configuration sub-system that can be disposed in a DAS or other telecommunication system, such as a repeater system. Certain aspects can normalize signals transmitted by a telecommunication system by adjusting a path gain for the signal path based on measurements from devices that have measured a test signal (or any other service signal) at measurement points in the signal path. The configuration sub-system can include one or more devices for preparing sectors for distribution to one or more coverage zones of the DAS or other telecommunication system. A DAS or other telecommunication system can include a downlink path for communicating downlink signals from an RF source (such as, but not limited to, a base station or repeater) to a remote antenna unit for radiation to a wireless device in a coverage area serviced by the remote antenna unit and an uplink path for communicating uplink signals recovered by a remote antenna unit to an RF receiver (such as, but not limited to, a base station or repeater).

A coverage zone can include a geographic area to which signal coverage is provided via a DAS or other telecommunication system. For example, in a DAS, a coverage zone can be assigned to multiple remote antenna units, each distributing the same RF signals. The RF signals distributed by the remote antenna units can be combined signals using multiple technologies, frequency bands, and operators. A sector can include one or more telecommunication channels to be radiated to mobile devices in coverage zones or otherwise distributed to the coverage zones, thereby providing telecommunication capacity in the coverage zones.

Non-limiting examples of preparing sectors for distribution to one or more coverage zones can include conditioning signals received from RF sources (such as, but not limited to, base stations or repeaters), combining signals received from multiple RF sources (such as, but not limited to, base stations or repeaters) from the same or multiple different operators, mapping sectors to coverage zones, mapping coverage zones to communication devices in communication with remote antenna units from one or more coverage zones, and the like. Conditioning signals received from RF sources (such as, but not limited to, base stations or repeaters) can include adjusting power levels of the signals such that a telecommunication system can communicate the signals with different coverage zones. Combining signals received from multiple from RF sources (such as, but not limited to, base stations or repeaters) can include combining signals transmitted via different technologies within a common frequency band and/or combining signals from different frequency bands for transmission to a common coverage zone. Mapping coverage zones to communication devices can include mapping coverage zones to remote antenna units and/or master units of a DAS. Preparing sectors for distribution to one or more coverage zones can also include combining sectors from each operator.

The configuration sub-system of a DAS or other telecommunication system can include an intelligent point of interface ("I-POI") system. A POI system can include a device or group of devices configured to interface directly with RF sources (such as, but not limited to, base stations or repeaters) or a group of RF sources. Such devices can include (but are not limited to) a signal leveler, a signal attenuator, a signal splitter, a signal combiner, a receive-and-transmit signal combiner, a splitter, a multiplexer, a test-tone generator, an RF power detector, an RF signal tagging mechanism, and the like. An i-POI system can provide an intelligent interface for communicating with the RF source or group of RF sources. Providing an intelligent interface can include controlling the leveling or attenuation based on the RF source signal conditions. An intelligent interface can also include analyzing incoming signals and determination of system level parameters based on the analysis. An intelligent interface can also assign a mark, a tag, or other identifier to any RF signal feed from an external RF source. The mark, tag, or other identifier can be traced or read by various components, modules or other devices communicating the RF signal. The route of each RF signal communicated via the DAS (or other telecommunication system) can be traced end-to-end or on any sub-leg. The route of each RF signal can be used for multiple purposes such as, but not limited to, assisting in signal cabling, generating a network schematic, generating a signal/block diagram, and/or mapping alarms and performance data to the referenced signal and services. A non-limiting example of an i-POI system is a base station router including circuitry for conditioning signals and duplexing signals communicated via a DAS or other telecommunication system.

The configuration sub-system of a DAS or other telecommunication system can also include one or more devices providing frequency band combining and mapping of sectors to coverage zones, such as a sector matrix that includes matrix switches configurable via software. The configuration sub-system can also include one or more devices providing operator combining and zone mapping, such as (but not limited to) a zone combiner.

The configuration sub-system can normalize power levels and/or noise levels for signals communicated via a DAS or other telecommunication system. Normalizing signals can include adjusting the respective gains of signal paths traversed by signals such that downlink signals are radiated by remote antenna units at specified power levels. Normalizing signals can also include adjusting the respective gains of signal paths traversed by signals such that uplink signals are provided to base stations at specified noise levels.

A non-limiting example of a configuration sub-system can include a system controller, one or more test signal generators, and one or more power measurement devices. In some aspects, the test signal generators can be integrated within or otherwise disposed in one or more devices of a DAS or other telecommunication system, such as (but not limited to) base station routers and remote antenna units. Integrating test signal generators or other devices in the DAS or other telecommunications system can include disposing test signal generators or other devices to be enclosed within one or more communication devices of the telecommunication system. In other aspects, the test signal generators can be separate devices configured to inject test signals at one or more points of a DAS or other telecommunication system. The power measurement devices can be disposed in measurement points in a DAS or other telecommunication system, such as base station routers, optical transceivers, and remote antenna units. The system controller can receive data from other components describing the configuration and operation of the DAS or other telecommunication system. The system controller can also control other components using control signals communicated via the control path.

The test signal generator disposed in the base station router or other POI system can provide test signals to one or more signal paths of the DAS or other telecommunication system, such as the downlink paths or uplink paths. Power measurement devices can measure the power of the test signal at different measurement points in the signal paths. For example, in a downlink direction, power measurement devices disposed in an optical transceiver and a remote antenna unit of each downlink path can measure the power of the test signal (or any other service signal) at one or more measurement points in each of the optical transceiver and the remote antenna unit. In an uplink direction, power measurement devices disposed in an optical transceiver and a base station router or other POI system can measure the signal level of a test signal (or any other service signal) generated at any point in the uplink path at one or more measurement points in each of the optical transceiver and the base station router or other POI system. The system controller can configure adjustable attenuators disposed in one or more components of the signal path (e.g., optical transceivers, sector matrices, remote antenna units) to adjust the signal path gains based on the measurements from the power measurement devices, thereby normalizing power levels of the downlink signals and/or noise levels of the uplink signals. The path gain can be adjusted based on one or more of a signal level of the test signal and/or the noise level of the test signal.

In additional or alternative aspects, the configuration sub-system can generate a network schematic for a DAS or other telecommunication system. To generate the network schematic, the configuration sub-system can provide an identification signal (such as, but not limited to, an RF-Tag) with a signal communicated via the telecommunication system. The identification signal can be identified by a particular device and port, such as (but not limited to) a base station router, as the origin of the signal. Each component in a signal path (e.g., each optical transceiver, splitter, and remote antenna unit) can decode the identification signal, report to the system controller that the component has received the identification signal, report to the system controller the route through which the signal is travelling through the component, and identify the component to the system controller. The system controller can determine, based on the reports, which components are included in a signal path and the connections between the components. The system controller can thereby generate a network schematic diagram and/or a net-list describing the connectivity of the DAS or other telecommunication system. The system controller can also verify whether the actual configuration and cabling of the DAS or other telecommunication system is in accordance with a desired configuration and cabling provided to the system controller. The system controller can also use an identification signal (such as, but not limited to, an RF-Tag) to monitor and report a break in the cabling, a change to the cabling, or other manipulation of the cabling.

The system controller can compare the network schematic or net-list automatically generated using one or more identification signals with a user-generated network schematic or net-list provided as input to the system controller to identify faults in the system, such as cabling errors or malfunctioning components. In additional or alternative aspects, the system controller can generate a cabling instructional interface from a network schematic. The cabling instructional interface can include step-by-step instructions for installing cables between devices in the DAS or other telecommunication system. The cabling instruction can also use visual and/or acoustical indicators on the platform or module to guide the user though the cabling (cable for signal source to signal termination) on a step-by-step basis.

In additional or alternative aspects, generating the network schematic can also include correlating system components with a specific operator, frequency band, technology, sector, and coverage area. The system controller can use the correlation to distribute relevant alarms to a specific operator, to indicate affected services and coverage area caused by an alarm, and to reconfigure remote antenna units surrounding an affected coverage area to mitigate the loss of service identified by the alarm. In some aspects, service-level alarming can be based at least in part on the identification signal (RF-Tag). Each identification signal can include a unique identifier. The system controller or other intelligence in a telecommunication system can determine that the unique identifier is associated with respective alarms and components or modules. The system controller can develop correlations between an alarm, a signal identifier and service, a sector, and/or an operator. Alarms can thus be filtered based on any of the criteria included in the correlation. For example, an alarm may be operator-selective or service-selective. In additional or alternative aspects, the system controller or other intelligence can identify multiple alarms with respect to the same signal path and determine a root cause for the multiple alarms. The system controller also provide additional information for trouble shooting.

In additional or alternative aspects, the configuration sub-system can measure PIM products generated by the undesirable mixing of signals in the DAS. In some aspects, the configuration sub-system can include a test signal generator. The test signal generator can provide two test signals to the downlink path. The frequencies of the test signals can be selected such that the mixing of the signals generates one or more PIM products. For example, the configuration sub-system can use test signals generating PIM products at frequencies in the uplink frequency bands. In other aspects, test signal generators from each of two devices in a DAS or other telecommunication system can provide test signals to a downlink path to simulate different combinations of PIM products at frequencies in different frequency bands. The power measurement devices in the downlink path and/or the uplink path can detect and measure the power of any PIM products generated by the mixing of the test signals at non-linear interfaces within the DAS.

In additional or alternative aspects, the configuration sub-system can minimize the overlap in signal coverage (i.e., the "soft handover area") between sectors in a coverage zone. A test signal generator in a telecommunication system can transmit a test signal to be radiated by a remote antenna unit of the telecommunication system. The test signal generator in a telecommunication system can be disposed in the remote antenna unit or in another component of the telecommunication system. The overlap in signal coverage between adjacent remote antenna units can be determined by measuring the received signal strength of the test signal at adjacent remote antenna units. The received signal strength can be measured using the power measurement device at each remote antenna unit. The system controller can receive the power measurements from the remote antenna units. The system controller can configure the remote antenna units to adjust their respective output powers based on an algorithm to minimize the overlap in signal coverage.

In additional or alternative aspects, the configuration sub-system can include one or more devices for measuring the power of extraneous or other external signals in coverage zone. Measuring the power of extraneous or other external signals in coverage zones can provide additional information for optimizing output power levels of one or more remote antenna units provide signal coverage in a coverage zone. For example, output power can be reduced based on measurements of low signal power associated with extraneous signals in a coverage zone.

In additional or alternative aspects, the configuration sub-system can include one or more devices for measuring signal quality data for signals communicated via the DAS or other communication system. Signal quality data can include data describing one or more characteristics of signal paths such as (but not limited to) signal latency, service response time, loss, signal-to-noise ratio ("SNR"), carrier-to-noise ratio ("CNR") cross-talk, echo, interrupts, frequency response, loudness levels. Signal quality data can be used to optimize or otherwise modify uplink and downlink gains. For example, a noise floor can be biased in favor of one remote antenna unit over other remote antenna units to provide a higher CNR for a given operator.

In additional or alternative aspects, the configuration sub-system can include one or more test signal generators configured to generate test signals for each service-signal on the system. The test signals can be transmitted to one or more remote antenna units via the same signal path as a corresponding service signal. A portable measurement receiver can identify which remote antenna units are radiating respective service-signals. A non-limiting example of a test signal is a coded signal modeling a signal from an RF source, such as a base station. The coded test signal can include identifiers for a base station and a sector. Standard receiver devices can read, decode, and display the identifiers, thereby allowing for verification of sectorization.

In additional or alternative aspects, a test signal generator can provide a test signal (coded or non-coded) to verify signal quality and integrity throughout an entire signal path and/or at one or more component of the signal path. The system controller can verify signal quality based on characteristics of the test signals communicated via the DAS or other communication system.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present invention.

FIG. 1 depicts a configuration sub-system 13 disposed in a telecommunication system 10 in communication with a base station 12. The telecommunication system 10 in FIG. 1 also includes a downlink path 14 and an uplink path 16. Uplink signals from different remote antenna units can be combined at an optical transceiver or other master unit. The configuration sub-system 13 can perform system leveling and compensation for signal losses in each component of the telecommunication system 10. The configuration sub-system 13 can also generate a network schematic of the telecommunication system 10 and identify configuration faults in the telecommunication system 10 (e.g., cabling errors and malfunctioning components) using the generated network schematic.

Figure 2:
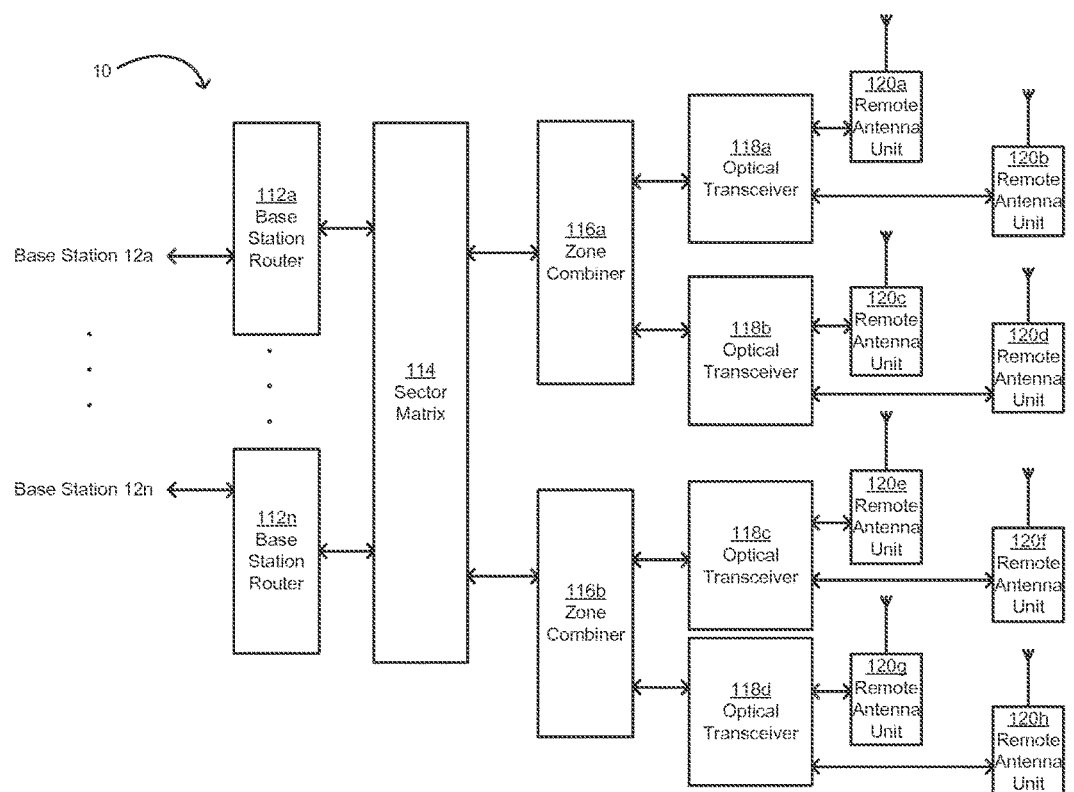
FIG. 2 is a block diagram of a telecommunication system in which a configuration sub-system can be disposed according to one aspect.

FIG. 2 depicts an exemplary telecommunication system 10. A non-limiting example of a telecommunication system 10 is a DAS. The telecommunication system 10 can include base station routers 112a-n in communication with base stations 12a-n and a sector matrix 114. The telecommunication system 10 can also include the optical transceivers 118a-d in communication with the zone combiners 116a, 116b and the remote antenna units 120a-h. The telecommunication system 10 can be positioned in an area to extend wireless communication coverage.

In the direction of a downlink path 14, the telecommunication system 10 can receive signals from the base stations 12a-n via a wired or wireless communication medium. Downlink signals can be received by the base station routers 112a-n. Downlink signals are signals at frequencies in a downlink frequency band provided from a base station to a remote antenna unit for radiation to wireless devices. A base station router can include one or more components in communication with carrier systems, such as the base stations of cellular service providers. A non-limiting example of a base station router can include an intelligent base transceiver station ("BTS") router. The base station routers 112a-n can intelligently interface signals between the base stations 12a-n and the other components of the telecommunication system 10. The base station routers 112a-n can provide the downlink signals to the optical transceivers 118a-d via the sector matrix 114 and the zone combiners 116a, 116b.

The sector matrix 114 can combine signals at frequencies in different frequency bands to be provided to a common coverage zone and can combine signals communicated using different technologies within a common frequency band. The sector matrix 114 can map sectors to coverage zones using a switch matrix. A coverage zone can be a specific coverage area assigned to one or more remote antenna units. Each remote antenna unit in a coverage zone can receive and radiate the same downlink signal. A sector can represent an amount of telecommunication capacity that can be allocated to wireless devices in one or more coverage zones. A sector can include one or more analog RF channels or digital signals representing RF channels, signals in one or more analog or digital RF bands, and/or one or more multiple-input and multiple-output ("MIMO") data streams. The switch matrix can be configured via software, obviating the need to modify the mapping of sectors to coverage zones via physical hardware changes.

The sector matrix 114 can also perform intra-band combining and inter-band combining of downlink signals. Intra-band combining can include combining signals transmitted via different technologies within a common frequency band. Inter-band combining can also include combining signals from different frequency bands for transmission to a common coverage zone.

In additional or alternative aspects, the sector matrix 114 can be omitted. A splitter/combiner of the distributed antenna system having a variable attenuator can be used to perform one or more functions of the sector matrix 114.

The zone combiners 116a, 116b can combine signals from different operators to be provided to a common coverage zone. An operator can be a telecommunication provider that provides signals to the DAS via one or more base stations 12a-n. Each operator can independently configure sectors associated with the operator according to the capacity needs of the operator and the number of coverage zones provided by the DAS. The zone combiners 116a, 116b can also map coverage zones to optical transceivers.

The zone combiners 116a, 116b can also map sectors to coverage zones. In some aspects, a one-to-one mapping of sectors to coverage zones can be used. In other aspects, a single sector can be mapped to multiple coverage zones. Different operators communicating via a telecommunication system can independently configure sectors associated with the operator according to capacity needs and constraints of the number of coverage zones of the telecommunication system.

The optical transceivers 118a-d can communicate with the zone combiners 116a, 116b via any communication medium capable of carrying signals between the zone combiners 116a, 116b and the optical transceivers 118a-d. Non-limiting examples of a suitable communication medium include copper wire (such as a coaxial cable), optical fiber, and microwave or optical link.

The optical transceivers 118a-d can provide downlink signals to and receive uplink signals from the remote antenna units 120a-h. Uplink signals are signals at frequencies in an uplink frequency band that are recovered by a remote antenna from wireless devices. Uplink signals can include signals received from wireless devices in the coverage zones serviced by the remote antenna units 120a-h. The remote antenna units 120a-h can communicate with the optical transceivers 118a-d via any communication medium capable of communicating signals between the optical transceivers 118a-d and the remote antenna units 120a-h. Non-limiting examples of a suitable communication medium include optical fiber optical link. The remote antenna units 120a-h can radiate the signals of the sector(s) distributed to the coverage zones servicing a physical area. In some aspects, a remote antenna unit can provide downlink signals to one or more antennas via a cable, such as a coaxial cable, and a power divider.

Although FIG. 2 depicts optical transceivers in communication with remote antenna units, any suitable communication device can communicate signals to the remote antenna units 120a-h. For example, other master units can communicate with the remote antenna units 120a-h via communication media such as (but not limited to) copper wire (such as a coaxial cable) and microwave links.

In the direction of an uplink path 16, the base station routers 112a-n can receive uplink signals from remote antenna units 120a-h via the optical transceivers 118a-d, the zone combiners 116a, 116b, and the sector matrix 114.

Although FIG. 2 depicts a telecommunication system 10 having two zone combiners 116a, 116b, four optical transceivers 118a-d, and eight remote antenna units 120a-h, a telecommunication system 10 can include any number of zone combiners, optical transceivers, and/or remote antenna units. Although FIG. 2 depicts each of the optical transceivers 118a-d communicating with two remote antenna units, an optical transceiver can communicate with any number of remote antenna units (including one).

Figure 3:
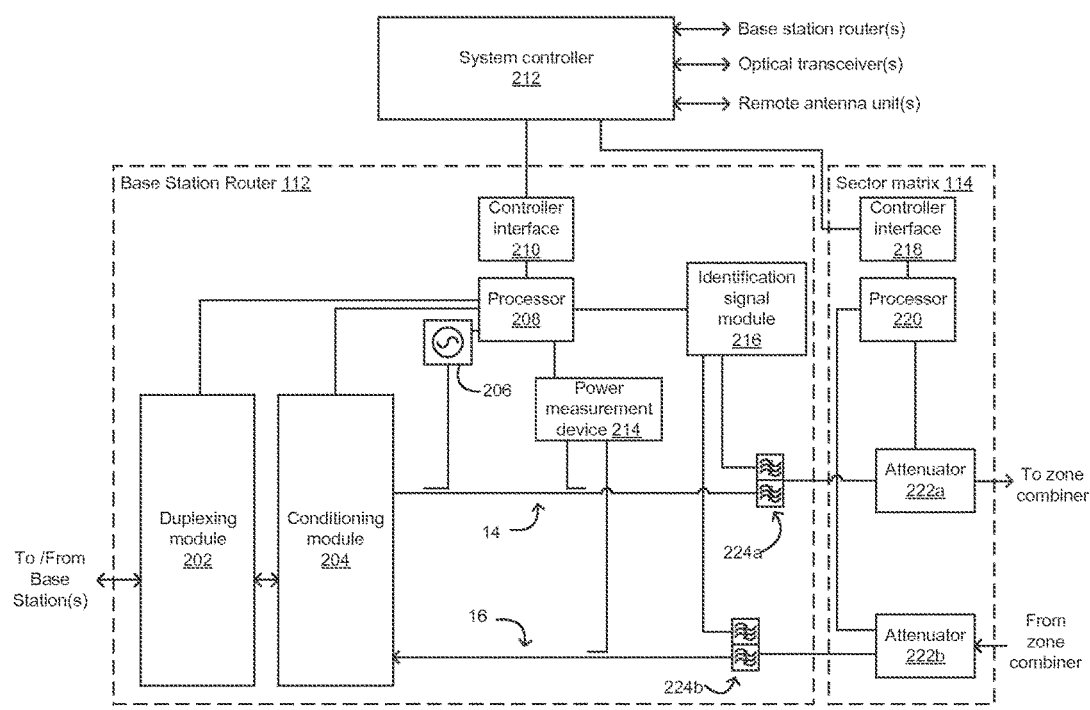
FIG. 3 is a block diagram of a configuration sub-system disposed in a base station router and a sector matrix according to one aspect.

A configuration sub-system 13 can be disposed in the telecommunication system 10 depicted in FIG. 2. One or more components of the configuration sub-system 13 can be disposed in one or more of the components of the telecommunication system 10. For example, FIG. 3 depicts an aspect of a base station router 112 and a sector matrix 114 in which a configuration sub-system 13 can be disposed. The base station router 112 can include components of the configuration sub-system 13 such as a duplexing module 202, a conditioning module 204, a test signal generator 206, a processor 208, a controller interface 210, a power measurement device 214, and an identification signal module 216. The sector matrix 114 can include components of the configuration sub-system 13 such as a controller interface 218, a processor 220, and attenuators 222a, 222b. Although the base station router 112 is depicted as having a single downlink path 14 and a single uplink path 16, the base station router 112 can include any number of uplink and downlink paths, including one of each.

The configuration sub-system 13 can also include a system controller 212 that can communicate with and control all components of the configuration sub-system 13 in the telecommunication system 10. The base station router 112 can communicate with the system controller 212 via the controller interface 210. The sector matrix 114 can communicate with the system controller 212 via the controller interface 218. Non-limiting examples of a controller interface can include a modem or Ethernet interface. The system controller 212 can configure the components of the configuration sub-system 13. An example of a system controller 212 is a Peripheral Interface Controller ("PIC"). The system controller 212 can communicate with components of the configuration sub-system 13 disposed elsewhere in the telecommunication system 10 (e.g., in the optical transceivers, the remote antenna units, etc.) via a control path. The control path can be any communication medium suitable for wired or wireless communication between components of the configuration sub-system 13. Non-limiting examples of a suitable communication medium include copper wire (such as a coaxial cable), optical fiber, and microwave or optical link. The system controller 212 can configure components of the configuration sub-system 13 using control signals communicated via the control path.

The duplexing module 202 can provide a common port connecting the downlink path 14 and uplink path 16. Duplexing module 202 can include, for example, one or more splitter-combiners or duplexers. The duplexing module 202 can receive signals from a base station and split the downlink signals to be transmitted from the uplink signals to be provided to the base station. The duplexing module 202 can provide downlink signals to downlink path 14. The duplexing module 202 can receive uplink signals from the conditioning module 204.

The conditioning module 204 can condition downlink signals received from a base station and uplink signals provided to a base station. Conditioning signals received from base stations can include adjusting power levels of the signals such that a telecommunication system can communicate the signals with different coverage zones. For example, conditioning downlink signals can include attenuating the power of downlink signals received from one or more of the base stations 12a-n. Conditioning uplink signals can include amplifying or attenuating the power of uplink signals provided to one or more of the base stations 12a-n. The conditioning module 204 can include one or more attenuators and/or one or more amplifiers. Conditioning downlink signals and/or uplink signals can provide an auto-leveling feature for the configuration sub-system 13. In some aspects, signals may be de-duplexed or otherwise separated to provide separate signal paths for the downlink signals and uplink signals communicated via the DAS or other telecommunication system.

The base station router 112 can also include the identification signal module 216. The identification signal module 216 can be disposed in one or more devices in the telecommunication system 10. The identification signal module 305 is coupled to the downlink path 14 via low/high path filter 224a and coupled to the uplink path 16 via low/high path filter 224b. The identification signal module 216 can be disposed in one or more of the base station routers 112a-n, as depicted in FIG. 3. In additional or alternative aspects, identification signal modules can be disposed in one or more of the optical transceivers 118a-d, as described below with respect to FIG. 4. The processor 208 can configure the identification signal module 216 to add an identification signal to each unique signal communicated via the telecommunication system 10, such as (but not limited to) unique downlink signals received from each base station or unique uplink signals communicated via each optical transceiver.

In some aspects, the identification signal module 216 can include a signal generator and combiner, such as (but not limited to) a summer, for generating the identification signal and combining the identification signal with downlink signals traversing the downlink path 14. In some aspects, the identification signal can be a tone having a low frequency, such as 1-5 kHz. In other aspects, the identification signal can be encoded and transmitted at a frequency not used by any operator communicating signals via the telecommunication system 10. The identification signal can identify that a downlink signal was provided to a downlink path from the specific base station router 112. For example, an identification signal can include a unique hardware identifier for a base station router 112 generating the identification signal.

The test signal generator 206 can provide test signals for normalizing downlink signals traversing the downlink path 14. The test signal generator 206 can provide a test signal to the downlink path 14 via a coupler. The test signal generator 206 can be, for example, an analog signal generator capable of producing continuous wave tones. The test signal generator 206 can be configured by the processor 208. The processor 208 can be, for example, a PIC. The processor 208 can receive control signals from the system controller 212 via the controller interface 210. The control signals can specify the frequency and power of the test signal.

The power measurement device 214 can measure the power level of a signal traversing the downlink path 14 via a coupler. In the uplink path 16, the power measurement device 214 can measure the signal level of test signals used to normalize uplink signals traversing the uplink path 16 and/or measure the noise level of uplink signals traversing the uplink path 16 via a coupler or switch. An example of a power measurement device 214 is a received signal strength indicator ("RSSI") detector.

The attenuators 222a, 222b of the sector matrix 114 can respectively attenuate downlink signals traversing the downlink path 14 and/or uplink signals traversing the uplink path 16. The amount of attenuation by attenuator attenuators 222a, 222b can be controlled by the processor 220 in response to control signals received from the system controller 212 via the controller interface 218.

Although FIG. 3 depicts the base station router 112 having the conditioning module 204, the test signal generator 206, the power measurement device 214, and the identification signal module 216, other configurations are possible. In additional or alternative aspects, one or more of the conditioning module 204, the test signal generator 206, the power measurement device 214, and the identification signal module 216 can be included in the sector matrix 114.

Figure 4:
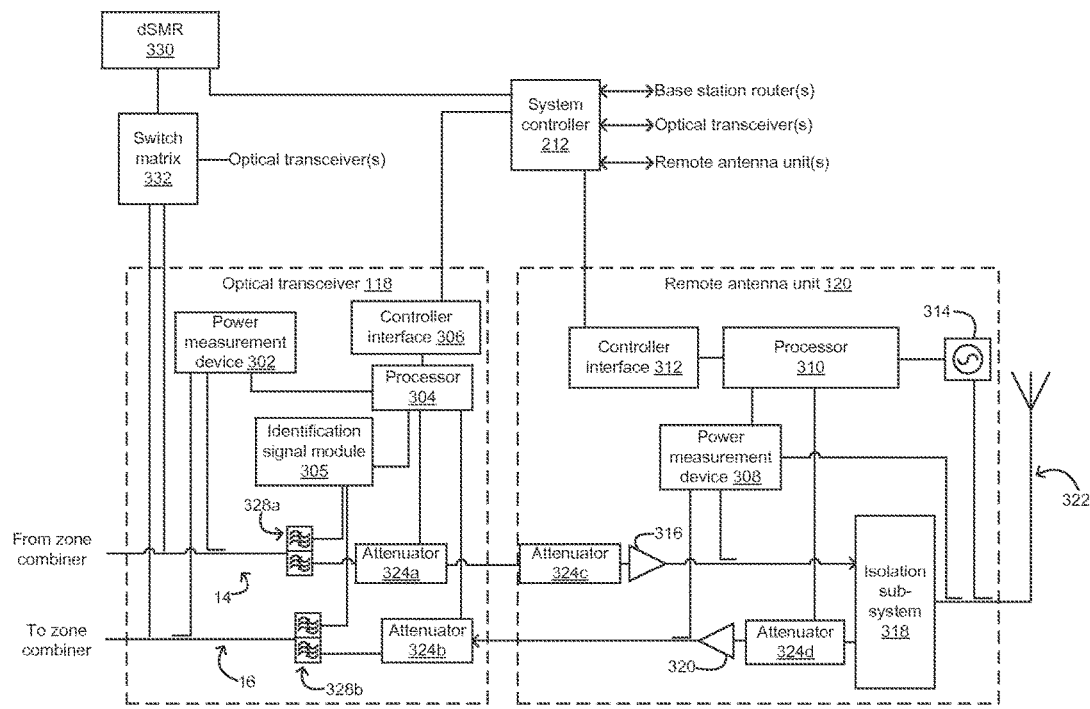
FIG. 4 is a block diagram of a configuration sub-system disposed in an optical transceiver and remote antenna unit according to one aspect.

The configuration sub-system 13 can also be disposed in one or more other components of the telecommunication system 10. For example, FIG. 4 depicts an aspect of the configuration sub-system 13 disposed in an optical transceiver 118 and a remote antenna unit 120. Components of the configuration sub-system 13 disposed in the optical transceiver 118 can include the power measurement device 302, the processor 304, the identification signal module 305, the controller interface 306, and the attenuators 324a, 324b. Components of the configuration sub-system 13 disposed in the remote antenna unit 120 can include the power measurement device 308, the processor 310, the controller interface 312, the test signal generator 314, and the attenuators 324c, 324d. The remote antenna unit 120 can also include the power amplifier 316, the isolation sub-system 318, the low noise amplifier 320, and an antenna 322. In additional or alternative aspects, the attenuator 324c can be included in the power amplifier 316. In additional or alternative aspects, the attenuator 324d can be included in an optical module of the remote antenna unit 120.

The remote antenna unit 120 can receive downlink signals via the downlink path 14 and provide uplink signals via the uplink path 16. The isolation sub-system 318 can isolate downlink signals traversing the downlink path 14 and transmitted via the antenna 322 from uplink signals traversing the uplink path 16 and recovered via the antenna 322. The isolation sub-system 318 can be, for example, a duplexer.

In a downlink direction, the power measurement devices 302, 308 can measure the power of test signals used to normalize downlink signals traversing the downlink path 14. The power measurement devices 302, 308 can measure the power of a downlink test signal provided by the test signal generator 206. The power measurement device 302 can measure the power of the downlink test signal at the input of the optical transceiver 118. The power measurement device 302 can provide the power measurement to the processor 304. The processor 304 can communicate the power measurement to the system controller 212 via the controller interface 306. The power measurement device 308 can measure the power of the test signal via a coupler positioned at the output of the power amplifier 316 of the remote antenna unit 120. In some aspects, the power measurement device 308 can also measure the power of the test signal via a coupler positioned at the antenna port of the isolation sub-system 318, as depicted in FIG. 4. In other aspects, an additional power measurement device can also measure the power of the test signal via a coupler positioned at the antenna port of the isolation sub-system 318. The power measurement device 308 can provide the power measurement to the processor 310. The processor 310 can communicate the power measurement to the system controller 212 via the controller interface 312.

The processor 304 can configure the identification signal module 305 to measure the identification signals which are transmitted by identification signal module 216 via the uplink path 16 and downlink path 14. The identification signal module 305 is coupled to the downlink path 14 via low/high path filter 328a and coupled to the uplink path 16 via low/high path filter 328b. Aspects of the identification signal module 305 can include a signal receiver and splitter for receiving the identification signal and splitting the identification signal from downlink signals traversing the downlink path 14 or uplink signals traversing the uplink path 16. In some aspects, the identification signal can be a tone having a low frequency, such as 1-5 kHz. In other aspects, the identification signal can be encoded and transmitted at a frequency not used by any operator communicating signals via the telecommunication system 10. The identification signal can identify that an uplink signal was provided to an uplink path from a specific optical transceiver 118. For example, an identification signal can include a unique hardware identifier for an optical transceiver 118 generating the identification signal.

The test signal generator 314 can provide test signals for normalizing uplink signals traversing the uplink path 16. The test signal generator 314 can provide an input test signal to the uplink path 16 via a coupler at an uplink input to the isolation sub-system 318. The test signal generator 314 can be, for example, an analog signal generator capable of producing continuous wave tones. The test signal generator 314 can be configured by the processor 310. The processor 310 can configure the test signal generator 314 to increase the power and/or change the frequency of the input test signal in response to control signals received from the system controller 212 communicated via the controller interface 312.

In some aspects, a digital signal generator and measurement receiver ("dSMR") 330, can be coupled to each optical transceiver 118 via a switch matrix 332. The switch matrix 332 can be coupled to the downlink path 14 and the uplink path 16 via non-directional probes. The dSMR 330 can include a continuous wave generator, a demodulation function, and a decoding function. The system controller 212 can be communicatively coupled to the dSMR 330 and the switch matrix 332. The system controller 212 can control communication between the dSMR 330 and the optical transceivers via the switch matrix 332.

Normalizing Signals Communicated via the DAS

The system controller 212 can normalize the power of signals traversing the downlink path 14 and the uplink path 16 using one or more of the conditioning module 204, the attenuators 324a-d and the attenuators 222a, 222b included in the sector matrix 114. In some aspects, different signals may require different power levels and/or noise levels due to different capacity requirements for different operators in a given coverage area or due to differences in the technology used to communicate signals via a DAS or other telecommunication system.

Figure 5:
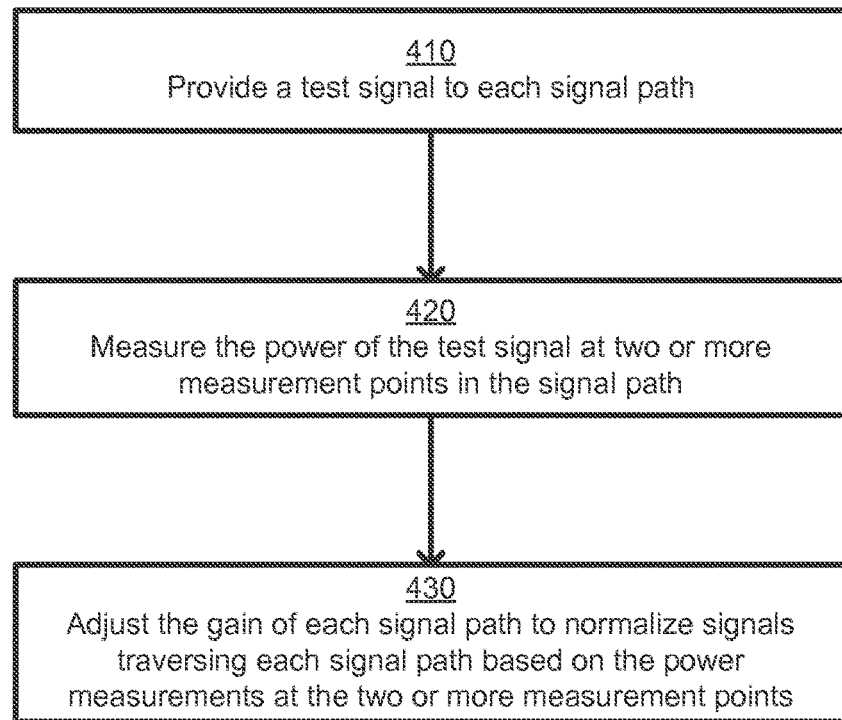
FIG. 5 is a flow chart illustrating a process for normalizing signals communicated via a telecommunication system using a configuration sub-system according to one aspect.

FIG. 5 depicts a flow chart illustrating a process 400 for normalizing signals communicated via a telecommunication system 10 according to one aspect. The process 400 is described with reference to the telecommunication system 10 depicted in FIG. 2 and the system implementation of the configuration sub-system 13 depicted in FIGS. 3 and 4. Other implementations and processes, however, are possible.

In block 410, a test signal is provided to each signal path in the telecommunication system 10. In some aspects, the configuration sub-system 13 provides the test signal. In other aspects, a base station in communication with the telecommunication system 10 provides a downlink test signal that can be used for normalization. The test signal can traverse each signal path between a base station router 112 and a remote antenna unit 120. In a downlink direction, the test signal generator 206 can provide a test signal to the downlink path 14 at the base station router 112. In an uplink direction, the test signal generator 314 can provide a test signal to the uplink path 16 at the remote antenna unit 120.

In block 420, the configuration sub-system 13 measures the power and/or signal level of the test signal at two or more measurement points in the signal path. In a downlink direction, the power measurement device 302 can measure the power of the test signal at the input of the optical transceiver 118 and the power measurement device 308 can measure the power of the test signal at the output of the power amplifier of the remote antenna unit 120. In an uplink direction, the power measurement device 302 can measure the signal level of the test signal and/or the noise level at the output of the optical transceiver 118 and the power measurement device 214 can measure the signal level of the test signal and/or the noise level at the input of the base station router 112.

In block 430, the configuration sub-system 13 adjusts the gain of each signal path to normalize signals traversing each signal path based on the power measurements at the two or more measurement points. The system controller 212 can determine at which points in the respective signal paths to adjust the gain.

In some aspects, normalizing the signals can include balancing the power levels of downlink signals communicated via one or more downlink paths. For example, in a downlink direction, the system controller 212 can receive the power measurements from power measurement devices 302, 308 to determine the signal power loss in the downlink path 14. The system controller 212 can provide control signals to the processors 208, 220, 310 via the controller interfaces 210, 218, 312. The control signals can cause the processors 208, 220, 310 to adjust the gain of the base station router 112, the sector matrix 114, and/or the remote antenna unit 120 via the conditioning module 204 and/or the attenuators 222a, 224a, 324c, respectively.

In other aspects, normalizing the signals can include balancing noise levels of uplink signals communicated via uplink paths. For example, in an uplink direction, the system controller 212 can receive the power measurements from power measurement devices 214, 302 to determine the noise levels at the measurement points in the uplink path 16. The system controller 212 can provide control signals to processors 208, 304 via controller interfaces 210, 306. The control signals can cause the processors 208, 304 to adjust the uplink gain of base station router 112 and/or the optical transceiver 118 via the conditioning module 204 and/or the attenuator 324b, respectively. The uplink gain of base station router 112 and/or the optical transceiver 118 can be adjusted to balance the noise level of the uplink signal traversing an uplink path. Balancing the noise level of the uplink signal can include preventing noise in the uplink signal from corrupting other uplink signals from other uplink paths. Corrupting an uplink signal can include overdriving one or more devices of the telecommunication system 10 such that information transmitted via the uplink signal is lost or otherwise degraded. For example, combining an uplink signal having an excessive noise level with other uplink signals at a combining device, such as (but not limited to) a summer, can corrupt one or more of the other uplink signals.

In some aspects, when base stations are providing downlink signals to the downlink path 14, the configuration sub-system 13 can deactivate the test signal generator 206 after executing blocks 420 and 430. The system controller 212 can determine the power level of signals provided from the base stations. The system controller 212 can cause the base station router 112 to configure the conditioning module 204 to attenuate downlink signals from one or more of the base stations 12a-n to a power level specified for the telecommunication system 10.

Figure 6:
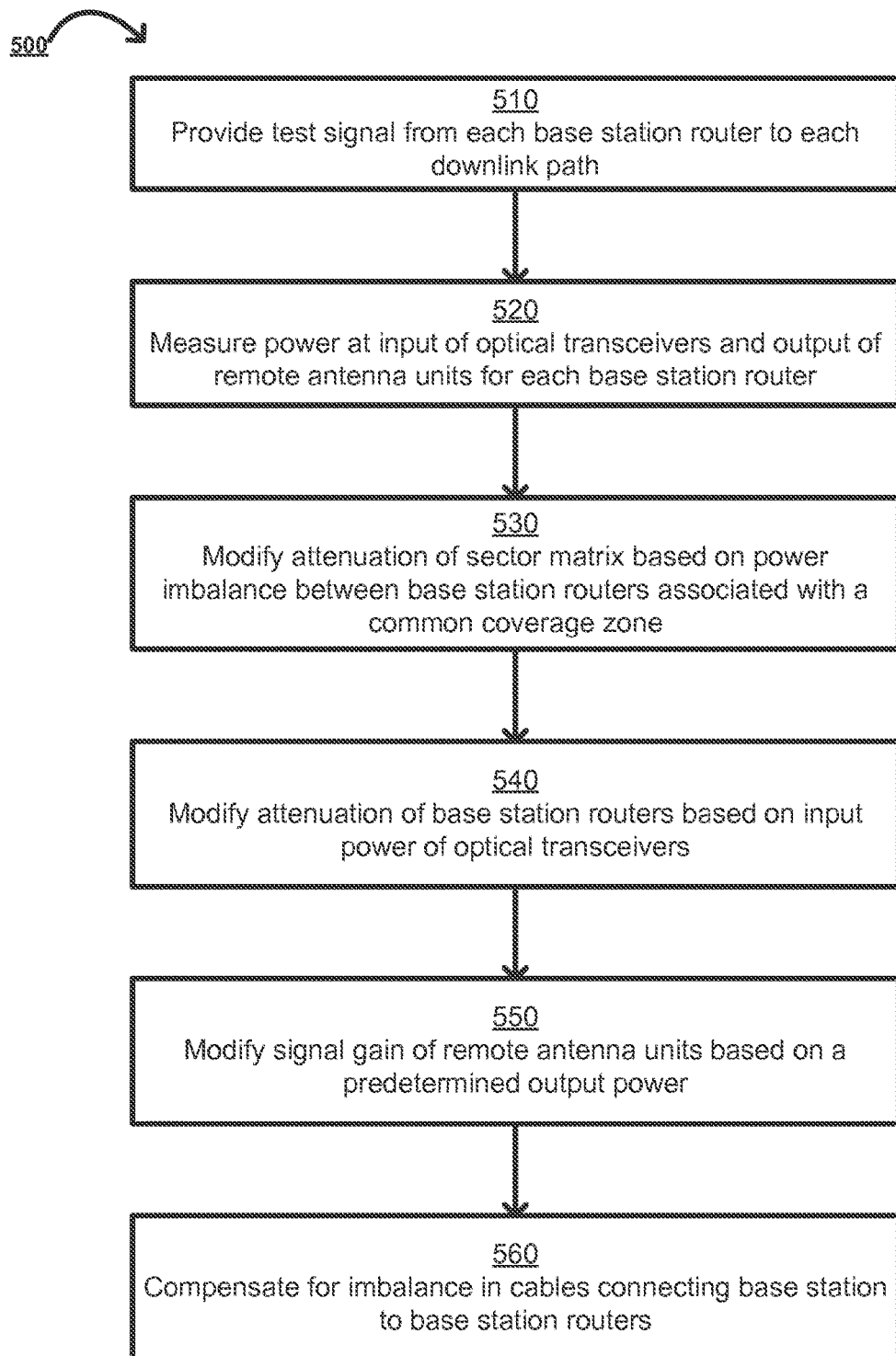
FIG. 6 is a flow chart illustrating an alternative process for normalizing signals communicated via a telecommunication system using a configuration sub-system according to one aspect.

FIG. 6 depicts a flow chart illustrating an alternative process 500 for normalizing signals communicated via a telecommunication system 10 a DAS according to one aspect. The process 500 is described with reference to the telecommunication system 10 depicted in FIG. 2 and the system implementation of the configuration sub-system 13 depicted in FIGS. 3 and 4. Other implementations and processes, however, are possible.

In block 510, the configuration sub-system 13 provides test signal from each base station router to each downlink path. For example, the system controller 212 can provide a control signal to a processor 208 of a base station router 112 via a controller interface 210. The control signal can specify an output power and frequency for the test signal, such as (but not limited to) 11 dBm. The processor 208 can configure the test signal generator 206 to provide a test signal having the specified output power and frequency.

In block 520, the configuration sub-system 13 measures the signal power at an input of one or more optical transceivers and one or more remote antenna units associated with each base station router. For example, in a downlink direction, the power measurement device 302 can measure the power of the test signal at the input of the optical transceiver 118 and the power measurement device 308 can measure the power of the test signal at the output of the power amplifier and/or at the antenna port of the remote antenna unit 120.

In block 530, the configuration sub-system 13 modifies the attenuation of the sector matrix 114 based on a power imbalance between base station routers associated with a common coverage zone. For example, the system controller 212 can provide a control signal to a processor 220 of the sector matrix 114 via the controller interface 218. The processor 220 can configure the attenuators 222a, 222b based on the control message.

In block 540, the configuration sub-system 13 modifies the attenuation of one or more base station routers based on the input power of the optical transceivers associated with each base station router. For example, the system controller 212 can provide a control signal to a processor 208 of a base station router 112 via a controller interface 210. The processor 220 can configure the conditioning module 204 based on the control message.

In block 550, the configuration sub-system 13 modifies the signal gain of one or more remote antenna units based on a predetermined output power for the one or more remote antenna units. For example, the system controller 212 can provide a control signal to a processor 310 of a remote antenna unit 120 via a controller interface 312. The processor 310 can configure one or more of the attenuators 324c, 324d based on the control message.

In block 560, the configuration sub-system 13 compensates for any imbalance in one or more cables connecting base stations 12a-n to base station routers 112a-n. For example, the configuration sub-system 13 can compensate for any imbalance by configuring the conditioning module 204 by providing a control signal to a processor 208 of a base station router 112 via a controller interface 210. The control signal can specify an amount of gain adjustment or attenuation for uplink signals and/or downlink signals communicated via the base station router 12. The processor 208 can configure the conditioning module 204 based on the control signal.

Network Schematic Generation

Figure 7:
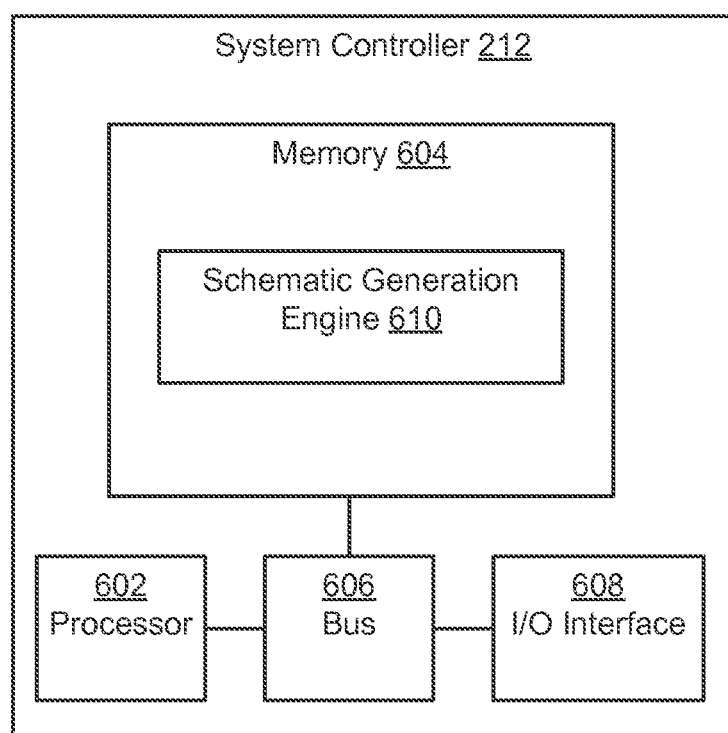
FIG. 7 is a block diagram of a controller for a schematic diagram of a telecommunication system according to one aspect.

In additional or alternative aspects, the configuration sub-system can generate a network schematic for the telecommunication system 10. FIG. 7 depicts a block diagram of a system controller 212 for generating the network schematic. The system controller 212 can include a processor 602 that can execute code stored on a computer-readable medium, such as a memory 604, to cause the system controller 212 to generate the network schematic. Examples of processor 602 include a microprocessor, a PIC, an application-specific integrated circuit ("ASIC"), a field-programmable gate array ("FPGA"), or other suitable processor. The processor 602 may include one processor or any number of processors.

The processor 602 can access code stored in memory 604 via a bus 606. The memory 604 may be any non-transitory computer-readable medium capable of tangibly embodying code and can include electronic, magnetic, or optical devices. Examples of memory 604 include random access memory ("RAM"), read-only memory ("ROM"), magnetic disk, an ASIC, a configured processor, or other storage device. Although FIG. 7 depicts the memory 604 as included in the system controller 212, the memory 604 can additionally or alternatively be accessed from a remote location or device by the system controller 212. The bus 606 may be any device capable of transferring data between components of the system controller 212. The bus 606 can include one device or multiple devices.

Instructions can be stored in memory 604 as executable code. The instructions can include processor-specific instructions generated by a compiler and/or an interpreter from code written in any suitable computer-programming language, such as C, C++, C#, Visual Basic, Java, Python, Perl, JavaScript, and ActionScript.

The instructions can include a schematic generation engine 610. The processor 602 can execute the schematic generation engine 610 to cause the system controller 212 to generate a network schematic for the telecommunication system 10, as explained in more detail below with respect to FIG. 8. The system controller 212 can receive inputs through input/output ("I/O") interface 608 and store the inputs in memory 604. A non-limiting example of such inputs is a user-defined network schematic identifying the desired components and signal paths of the telecommunication system 10. The schematic generation engine 610 can also generate outputs, such as (but not limited to) the network schematic. The outputs can be provided to a display device (not pictured) via the I/O interface 608.

This exemplary system configuration is provided to illustrate configurations of certain aspects. Other configurations may of course be utilized.

Figure 8:
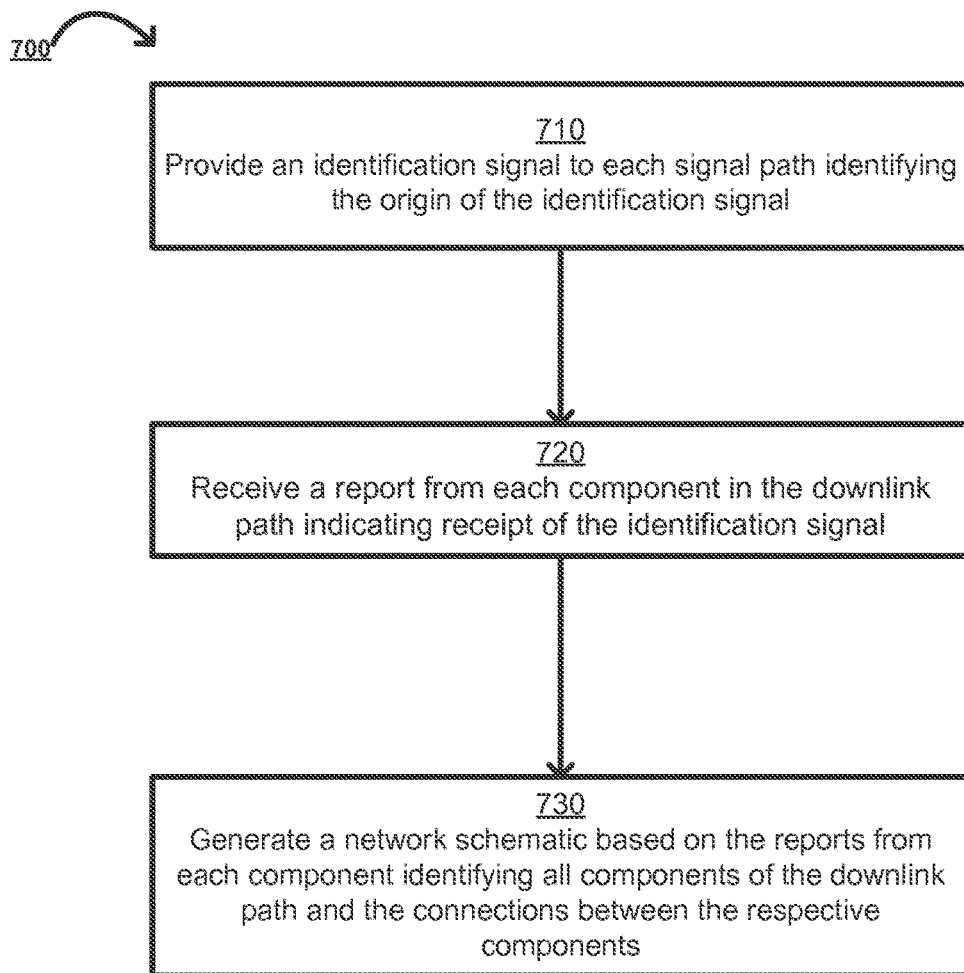
FIG. 8 is a flow chart illustrating a process for generating a schematic diagram of a telecommunication system using an identification signal generated by a configuration sub-system according to one aspect.

FIG. 8 depicts a flow chart illustrating a process 700 for generating a schematic diagram of a DAS using an identification signal provided by a base station router 112. The process 700 is described with reference to the telecommunication system 10 depicted in FIG. 2, the system implementation of the configuration sub-system 13 depicted in FIGS. 3 and 4 and the system implementation of the system controller 212 depicted in FIG. 7. Other implementations and processes, however, are possible.

In block 710, the configuration sub-system 13 provides an identification signal to each signal path of the telecommunication system 10. The system controller 212 can configure a signal identification module, such as a signal identification module 216 of a base station router 112 or a signal identification module 305 of an optical transceiver 118, to generate the identification signals. In some aspects, the configuration sub-system 13 can provide an identification signal to each downlink path. In other aspects, the configuration sub-system 13 can provide an identification signal to each uplink path. In other aspects, the configuration sub-system 13 can provide identification signals to a combination of uplink paths and downlink paths. Each identification signal can identify a device from which the identification signal originated. For example, an identification signal provided to a downlink path can identify base station router 112 from which the identification signal originated. In some aspects, the base station router 112 can generate the identification signal and combine the identification signal with a downlink signal from a base station. The processor 208 can select a frequency for the identification signal. The identification signal can be a tone having a low frequency, such as 1-5 kHz. In other aspects, the base station router 112 can combine the identification signal with a test signal from test signal generator 206.

In block 720, the configuration sub-system 13 receives a report from each component in the downlink path indicating receipt of the identification signal. At an optical transceiver 118, the processor 304 can decode the identification signal and communicate receipt of the identification signal to the system controller 212 via the controller interface 306. At a remote antenna unit 120, the processor 310 can decode the identification signal and communicate receipt of the identification signal to the system controller 212 via the controller interface 312. The optical transceiver 118 and the remote antenna unit 120 can also communicate a hardware identifier identifying the specific optical transceiver or remote antenna unit and a time stamp identifying when the identification signal was received. The processor 602 of the system controller 212 can receive data from each component via the I/O interface 608, such as (but not limited to) a report of receiving the identification signal, a hardware identifier identifying a component, and/or the time stamp identifying when the identification signal was received.

In additional or alternative aspects, the identification signal may cease traversing a signal path at master side input to an optical transceiver. Detailed information on components and a list of remote antenna units can be stored and/or collected by a processor 310 of each remote antenna unit 120. The processor 310 of each remote antenna unit 120 can report the information on the components and the list of remote antenna units to the system controller 212 via the controller interface 312.

In block 730, the configuration sub-system 13 generates a network schematic based on the reports from each component identifying all components of the downlink path and the connections between the respective components. The processor 602 of the system controller 212 can execute the schematic generation engine 610 to generate the network schematic. The schematic generation engine 610 can determine, based on data received via the I/O interface 608, which components received the identification signal and the order in which the identification signal was received by each component. The schematic generation engine 610 can generate a list of components mapping connections between components and a network schematic visually depicting the components the connections between the components.

In additional or alternative aspects, the configuration sub-system 13 can use the generated network schematic to identify faults in the telecommunication system 10. In some aspects, the system controller 212 can receive as input a user-defined network schematic identifying the desired components and signal paths of the telecommunication system 10. For example, the user-defined network schematic can be received via the I/O interface 608 and stored to the memory 604. The system controller 212 can compare the user-defined network schematic to the network schematic generated in block 730. The system controller 212 can determine whether the user-defined network schematic is identical to the network schematic generated in block 730. The system controller 212 can output an error message via the I/O interface 608 identifying differences between the network schematics. For example, the error message can be displayed at a graphical interface on a display device accessible via the I/O interface 608.

In additional or alternative aspects, the system controller 212 can generate a cabling instructional interface from a network schematic. The system controller 212 can output the cabling instructional interface via the I/O interface 608. The cabling instructional interface can include step-by-step instructions for installing cables between devices in the DAS or other telecommunication system.

In some aspects, generating the network schematic can include associating each component in a signal path with a particular identification signal. The identification signal and its associated components can be correlated with a specific operator, frequency band, technology, sector, and coverage area. The system controller 212 can use the correlation to distribute relevant alarms to a specific operator. The system controller 212 can also use the correlation to indicate affected services and coverage area caused by an alarm. The system controller can 212 also use the correlation to reconfigure remote antenna units surrounding an affected coverage area to mitigate the loss of service identified by the alarm.

In additional or alternative aspects, the sector matrix 114 and/or the zone combiners 116a, 116b can include automated switching functions. Including automated switching functions can allow for effective reuse of available base stations 12a-n. Automated switching can be performed based on external triggers received via an input/output ("I"/O") interface, a schedule, an alarm conditions detected for the telecommunication system 10 (e.g., a base station power has ceased), and the like. Multiple configurations for the telecommunication system 10 can be stored on the memory 604. The system controller 212 can configure the telecommunication system based on the triggers. For example, a first configuration can be used for providing signal coverage from base stations 12a-n to an office during working hours. A second configuration can be used for providing signal coverage from base stations 12a-n to public venues during non-working hours.

PIM Testing

The configuration sub-system 13 can measure passive intermodulation ("PIM") products in the telecommunication system 10. In some aspects, the test signal generator 206 can provide two test signals to the downlink path 14. In other aspects, the test signal generator 314 can provide two test signals to the uplink path 16. In some aspects, a test signal generator in a base station router 112 can provide two test signals to the downlink path 14. The frequencies of the test signals can be selected such that the mixing of the signals generates one or more PIM products at frequencies in the uplink frequency bands. In other aspects, the test signal generators from each of two base station routers can provide a test signal to the downlink path 14 to simulate different combinations of PIM products at frequencies in different frequency bands. The power measurement devices 214, 302, 308 can detect and measure the power of PIM products generated in either the downlink path 14 or the uplink path 16.

In additional or alternative aspects, an additional device to the optical transceivers 118a-d, such as a digital signal generator and measurement receiver 330, can provide the two test signals to the downlink path 14 and/or the uplink path 16 at the inputs of one or more of the optical transceivers 118a-d. The digital signal measurement receiver can include a continuous wave generator, a demodulation function, and a decoding function.

Minimizing Signal Coverage Overlap between Sectors

The configuration sub-system 13 can minimize the overlap in signal coverage (i.e., the "soft handover area") between sectors in a coverage zone. The test signal generator 314 can transmit, via a non-directional probe (not shown) in each remote antenna unit 120, a test signal at a test frequency which is unused or which is outside the frequency band used to transmit other signals in the coverage area. The overlap in signal coverage between adjacent remote antenna units can be determined by measuring the received signal strength of the test signal at adjacent remote antenna units. The received signal strength can be measured at each remote antenna unit 120 using the power measurement device 308, via a non-directional probe (not shown). The system controller 212 can receive the power measurements from the remote antenna units and configure the remote antenna units to adjust their respective output powers based on an algorithm to minimize the overlap in signal coverage. In some aspects, signal coverage overlap can be minimized by manually aligning coverage antennas. The coverage antennas can be aligned based on power measurements from the power measurement devices of the configuration sub-system 13. In other aspects, signal coverage overlap can be minimized by automatically aligning active coverage antennas, such as smart beamwidth antennas or motorized antennas.

The foregoing description, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each example disclosed can be combined with any other example.

What is claimed is:

1. A configuration sub-system comprising:
an input communicatively coupleable to a base station;
a test signal generator integrated into the configuration sub-system, wherein the configuration sub-system is configured to switch between a first mode and a second mode, wherein in the first mode the configuration sub-system is configured to provide a test signal generated by the test signal generator to a downlink path, wherein in the second mode the configuration sub-system is configured to provide an RF downlink signal that is received via the input from the base station to the downlink path and deactivate the test signal generator, wherein the configuration sub-system is configured to provide the RF downlink signal to the downlink path only in the second mode;
a power measurement device integrated into the configuration sub-system, the power measurement device being configured to:
measure a test signal power of the test signal at a measurement point in the downlink path, and
measure a downlink signal power of the RF downlink signal at the measurement point; and
a controller configured to normalize signals transmitted using a distributed antenna system via the configuration sub-system by adjusting a downlink path gain for the downlink path based on the test signal power measured by the power measurement device, wherein the distributed antenna system is configured to transmit the RF downlink signal using the downlink path gain as adjusted by the controller.

2. The configuration sub-system of claim 1, further comprising an additional power measurement device integrated into the configuration sub-system, the additional power measurement device being configured to measure an additional test signal power of the test signal at an additional measurement point in the downlink path traversed by the test signal, wherein the controller is configured to normalize downlink signals for the distributed antenna system by:
determining a signal power loss or drop in the downlink path based on a first power measurement received from the power measurement device and a second power measurement received from the additional power measurement device; and
compensating for the signal power loss or drop in the downlink path by adjusting the downlink path gain of the downlink path such that downlink signals are transmitted using the distributed antenna system at a specified power level.

3. The configuration sub-system of claim 2, wherein the controller is configured to adjust the downlink path gain of the downlink path by modifying a signal attenuation by an attenuator in at least one of a base station router, a sector matrix of the distributed antenna system, a splitter/combiner of the distributed antenna system having a variable attenuator, an optical transceiver of the distributed antenna system, and a remote antenna unit of the distributed antenna system.

4. The configuration sub-system of claim 1, wherein the controller is further configured to normalize uplink signals transmitted via an uplink path by:
determining a noise level at the measurement point; and
adjusting an uplink path gain of the uplink path such that noise included in an uplink signal traversing the uplink path is prevented from corrupting the uplink signal.

5. The configuration sub-system of claim 4, wherein the uplink path comprises a signal path from a remote antenna unit of the distributed antenna system that includes at least a portion of the configuration sub-system, wherein the controller is further configured to normalize the uplink path gain using a specified noise level for providing the uplink signals to the base station.

6. The configuration sub-system of claim 1,
wherein the test signal generator is further configured to provide an additional test signal to the downlink path;
wherein the controller is further configured to select respective frequencies of the test signal and the additional test signal such that mixing the test signal and the additional test signal generates an intermodulation product having a frequency in an uplink frequency band, wherein the uplink frequency band comprises a plurality of frequencies of uplink signals received by the distributed antenna system;
wherein the power measurement device is further configured to measure a signal power of the intermodulation product.

7. The configuration sub-system of claim 1, wherein the controller is further configured to automatically modify signal coverage provided by the base station based on at least one trigger, wherein the at least one trigger comprises at least one of an external trigger received by the controller via an input/output interface, a schedule, and an alarm condition.

8. The configuration sub-system of claim 1, further comprising an additional test signal generator integrated into a remote antenna unit of the distributed antenna system, wherein the additional test signal generator is configured to provide an additional test signal to an uplink path, wherein the controller is further configured to:
determine a downlink loss for the downlink path based on the test signal power measured by the power measurement device; and determine an uplink loss for the uplink path based on an additional test signal power measured by the power measurement device for the additional test signal.

9. The configuration sub-system of claim 1, further comprising an identification signal module configured to provide an identification signal to a signal path of the distributed antenna system, wherein the identification signal identifies a device from which the identification signal originated, wherein the controller is further configured to:
receive a respective report from each component of a plurality of components in the signal path indicating receipt of the identification signal; and
identify each component of the signal path reporting receipt of the identification signal.

10. The configuration sub-system of claim 1, wherein the configuration sub-system is at least partially integrated into one or more of: a point of interface of the distributed antenna system, an intelligent point of interface of the distributed antenna system, a base station router of the distributed antenna system, a sector matrix of the distributed antenna system, a splitter/combiner of the distributed antenna system having a variable attenuator, an optical transceiver of the distributed antenna system, and a remote antenna unit of the distributed antenna system.

11. A configuration sub-system comprising:
an identification signal module configured to provide an identification signal to a signal path of a distributed antenna system, wherein the identification signal includes an identifier of a device from which the identification signal originated; and
a controller configured to:
receive a respective report from each component of a plurality of components in the signal path indicating receipt of the identification signal; and
identify each component of the signal path reporting receipt of the identification signal.

12. The configuration sub-system of claim 11, wherein the controller is configured to generate at least one of a network schematic and a net-list including each component of the signal path and identifying connections between respective components of the signal path based on the received reports.

13. The configuration sub-system of claim 11, wherein the controller is further configured to:
provide an interface describing a process for connecting components of the distributed antenna system, wherein the interface is generated based on a network schematic or a net-list accessible by the controller;
responsive to a first component being connected to a second component, configure the identification signal module to provide the identification signal to the signal path of the distributed antenna system;
determine that a connection between the first component and second component does not correspond to the network schematic or the net-list accessible by the controller; and
based on determining that the connection between the first component and second component does not correspond to the network schematic or the net-list, generate at least one alarm identifying a connection error.

14. The configuration sub-system of claim 11, wherein the controller is further configured to:
access a network schematic or a net-list describing the distributed antenna system;
determine that the plurality of components of the signal path are connected differently than described in the network schematic or the net-list; and
responsive to determining that the plurality of components of the signal path are connected differently than described in the network schematic or the net-list, generate an alarm identifying a connection error in the distributed antenna system.

15. The configuration sub-system of claim 14, wherein the controller is further configured to:
determine that multiple alarms are identifying a common connection error or identifying a common signal path; and
extract a single alarm or a root-cause alarm from the multiple alarms.

16. The configuration sub-system of claim 14, wherein the controller is further configured to correlate the alarm with at least one of an operator or service communicating via the distributed antenna system, a sector of the distributed antenna system, and a coverage area of the distributed antenna system.

17. The configuration sub-system of claim 11, further comprising
an input communicatively coupleable to a base station;
a test signal generator integrated into the configuration sub-system, wherein the configuration sub-system is configured to switch between a first mode and a second mode, wherein in the first mode the configuration sub-system is configured to provide a test signal generated by the test signal generator to a downlink path, wherein in the second mode the configuration sub-system is configured to provide an RF downlink signal to the downlink path that is received via the input from the base station and deactivate the test signal generator; and
a power measurement device integrated into the configuration sub-system, the power measurement device being configured to measure a test signal power of the test signal at a measurement point in the downlink path and a downlink signal power of the RF downlink signal at the measurement point;
wherein the controller is further configured to normalize signals transmitted using the distributed antenna system via the configuration sub-system by adjusting a downlink path gain for the downlink path based on the test signal power measured by the power measurement device, wherein the distributed antenna system is configured to transmit the RF downlink signal using the downlink path gain as adjusted by the controller.

18. The configuration sub-system of claim 11, wherein the configuration sub-system is at least partially integrated into one or more of: a point of interface of the distributed antenna system, an intelligent point of interface of the distributed antenna system, a base station router of the distributed antenna system, a sector matrix of the distributed antenna system, a splitter/combiner of the distributed antenna system having a variable attenuator, an optical transceiver of the distributed antenna system, and a remote antenna unit of the distributed antenna system.

19. A method comprising:
configuring a distributed antenna system to operate in a first mode, wherein the first mode comprises providing, by a test signal generator integrated into a unit of the distributed antenna system, a test signal to a downlink path of the distributed antenna system;
switching the distributed antenna system to operate in a second mode, wherein the second mode comprises receiving an RF downlink signal from a base station communicatively coupled to the distributed antenna system and providing the RF downlink signal to the downlink path, wherein the RF downlink signal is only provided to the downlink path in the second mode, wherein the second mode further comprises deactivating the test signal generator;

measuring a test signal power of the test signal at a measurement point in the downlink path and a downlink signal power of the RF downlink signal at the measurement point; and normalizing signals transmitted via the distributed antenna system by adjusting a downlink path gain for the downlink path based on the test signal power, wherein the RF downlink signal is transmitted via the distributed antenna system using the adjusted downlink path gain.

20. The method of claim 19, further comprising:

providing an identification signal to a signal path of the distributed antenna system, wherein the identification signal identifies a device from which the identification signal originated;

receiving a respective report from each component of a plurality of components in the signal path indicating receipt of the identification signal; and identifying each component of the signal path reporting receipt of the identification signal.

21. The method of claim 20, wherein providing the identification signal to the signal path comprises at least one of:

combining the identification signal with an additional test signal generated by the test signal generator; and combining the identification signal with a downlink signal received from the base station.

22. A distributed antenna system comprising:

a unit communicatively coupleable to a base station;

a test signal generator integrated into the unit, wherein the test signal generator is configured to provide a test signal to a downlink path of the distributed antenna system;

an additional test signal generator integrated into a remote antenna unit of the distributed antenna system, wherein the additional test signal generator is configured to provide an additional test signal to an uplink path of the distributed antenna system;

a power measurement device integrated into the unit and communicatively coupled to the downlink path and the uplink path, the power measurement device being configured to:

measure a test signal power of the test signal for the downlink path, and measure an additional test signal power of the additional test signal for the uplink path; and a controller integrated into the unit, wherein the controller is configured to:

determine a downlink loss for the downlink path based on the test signal power measured by the power measurement device; and determine an uplink loss for the uplink path based on the additional test signal power measured by the power measurement device.

23. The distributed antenna system of claim 22, wherein the unit is configured to switch between a first mode and a second mode, wherein in the first mode the unit is configured to provide the test signal to the downlink path, wherein in the second mode the unit is configured to provide an RF downlink signal that is received via the unit from the base station to the downlink path and deactivate the test signal generator;

wherein the power measurement device is further configured to measure a downlink signal power of the RF downlink signal at a measurement point;

wherein the controller is further configured to normalize signals transmitted via the distributed antenna system by adjusting a downlink path gain for the downlink path based on the test signal power measured by the power measurement device, wherein the unit is configured to transmit the RF downlink signal using the downlink path gain as adjusted by the controller.

* * * * *